United States Patent
Karlinger

(10) Patent No.: US 6,511,247 B2
(45) Date of Patent: Jan. 28, 2003

(54) ROBOT WITH A RETAINING STRIP WHICH CAN BE PLACED ON A GEARBOX FOR FIXING CONTROL CAMS

(75) Inventor: Stefan Karlinger, Augsburg (DE)

(73) Assignee: Kuka Roboter GmbH (DE)

( * ) Notice: Subject to any disclaimer, the term of this patent is extended or adjusted under 35 U.S.C. 154(b) by 71 days.

(21) Appl. No.: 09/780,776

(22) Filed: Feb. 9, 2001

(65) Prior Publication Data

US 2001/0018005 A1 Aug. 30, 2001

(30) Foreign Application Priority Data

Feb. 12, 2000 (DE) .................................. 200 02 530 U

(51) Int. Cl.[7] ................................................. B25J 19/00
(52) U.S. Cl. ........................... 403/11; 403/21; 403/24; 901/50
(58) Field of Search ............................ 403/11, 114, 21, 403/24, 294, 293, 296; 74/606 R, 90.01, 490.05, 567, 568, 568 FS; 901/25, 50, 49

(56) References Cited

U.S. PATENT DOCUMENTS

| | | | |
|---|---|---|---|
| 4,274,802 A | | 6/1981 | Inaba et al. |
| 4,540,331 A | * | 9/1985 | Stanner et al. ............... 414/730 |
| 4,714,865 A | * | 12/1987 | Chin et al. ................... 318/563 |
| 4,815,587 A | * | 3/1989 | Musil ........................ 198/728 |
| 5,018,407 A | * | 5/1991 | Hoecht ...................... 74/606 R |
| 5,085,535 A | * | 2/1992 | Solberg et al. ............... 403/24 |
| 5,762,437 A | * | 6/1998 | Neilson et al. ............... 403/24 |
| 6,214,057 B1 | * | 4/2001 | Spencer et al. ............... 901/49 |
| 6,283,669 B1 | * | 9/2001 | Toney et al. ................. 403/294 |

FOREIGN PATENT DOCUMENTS

DE        29 03 185 C2        8/1979

* cited by examiner

Primary Examiner—Lynne H. Browne
Assistant Examiner—Kenneth Thompson
(74) Attorney, Agent, or Firm—McGlew and Tuttle, P.C.

(57) ABSTRACT

The invention relates to a multiaxis robot with at least one gear associated with a robot axis and having a gearbox with positional retaining strips for fixing control cams for monitoring the swivel angle of the robot axis, the retaining strips having a substantially arcuate construction with an inner circumference roughly corresponding to the outer circumference of the gearbox and the retaining strips can be frontally braced against one another for fixing on the gearbox.

10 Claims, 2 Drawing Sheets

ROBOT WITH A RETAINING STRIP WHICH CAN BE PLACED ON A GEARBOX FOR FIXING CONTROL CAMS

FIELD OF THE INVENTION

The invention relates to a multiaxis robot with at least one gear associated with a robot axis and having a gearbox with circumferentially placeable retaining strips for fixing control cams for monitoring the swivel angle of the robot axis.

BACKGROUND OF THE INVENTION

For monitoring and/or adjusting a permitted swivel angle of individual robot axes adapted to the given movement conditions of the robot, it is known to place on a robot part, such as the rocker arm, control cams following the gear circumference and which monitor the operating range of the robot corresponding to the desired swivel angle. For the circumferential, rotary fixing of the control cams use is generally made of retaining strips, which are screwed to the circumference of the robot axis. In order to ensure the small tolerances necessary for a satisfactory operation of the robot, the surfaces for fixing the retaining strips must be worked, e.g. hardened, ground, turned, milled and/or profiled. In the case of multiaxis industrial robots, which have a caroussel swivellable about a basic axis (A1 axis) and placed on a frame and a robot arm swivellable about several axes and placed on a rocker arm on the caroussel, the retaining strips for fixing the control cams for monitoring the swivel angle of the A1 axis are e.g. placed on the circumference of a slewing ring of the caroussel.

In the case of radial screwing of the retaining strips to the circumference of the gearbox on the one hand the handling for fitting and removing the retaining strips is complicated and on the other the rotational accuracy of the grooved or retaining strip is limited.

In the case of a robot of the aforementioned type and whilst avoiding the aforementioned disadvantages, the problem of the invention is to propose a connection between the retaining strips for fixing the control cams and the robot, which ensures the best possible rotational accuracy of the retaining strips and requires a limited amount of space.

SUMMARY OF THE INVENTION

In the case of a robot of the aforementioned type, the invention solves this problem in that the retaining strips have a substantially arcuate construction with an inner circumference roughly corresponding to the outer circumference of the gearbox and in that the retaining strips are frontally braceable against one another for fixing to the gearbox.

The construction according to the invention permits a simple and rapid direct fitting of the arcuate retaining strips to the circumference of the gearbox by bracing the same on the gearbox.

As a result of the invention a more precise positioning of the grooved strips is possible in a simpler and faster way than is the case in the prior art.

In a preferred embodiment, bracing is brought about in that in the vicinity of their ends the retaining strips have in each case an axial hole receiving a retaining pin, each retaining pin being radially traversed by at least one hole serving to receive a locking screw passing through the holes of the retaining pins of two adjacent retaining strips for the purpose of bracing the retaining strips on the gearbox. In this way the circumferential bracing of the retaining strips on the gearbox can be adjusted by means of the locking screws.

Appropriately the retaining pins are traversed by in each case two holes receiving a locking screw and preferably at least one of the holes, traversed by the locking screw, of the retaining pins of two adjacent retaining strips is a tapped hole in whose thread engages the associated locking screw.

In a preferred development the retaining strips can be circumferentially fixed to the gearbox by the retaining pins passing at least on one side out of the axial holes of the retaining strips and e.g. a head of the retaining pins passing out of the axial holes of the retaining strips can be engaged in a shaped recess to which the gear is secured or strongly connected to the gearbox.

The retaining strips are preferably constructed in per se known manner as grooved strips with externally circumferentially positioned webs and grooves for fixing the control cams, the webs of the grooved strips in particular having a substantially T-shaped profile.

Appropriately there are two arcuate retaining strips substantially completely engaging round the gearbox and which span the latter by in each case 180°.

According to a preferred development the inner circumference of the retaining strips has a complimentary profile to a retaining profile located on the outer circumference of the gearbox for the positive bracing of the retaining strips on the gearbox.

The profile of the retaining strips complimentary to the retaining profile of the gearbox ensures an axial positive engagement, so that during bracing the parts are precisely positioned. As a result of the circumferential bracing and the symmetrical arrangement a maximum possible rotational accuracy of the grooved strips is ensured.

In a preferred development, the retaining profile of the gearbox has at least one circumferential collar and the profile of the retaining strips at least one circumferential groove complimentary thereto, or the retaining profile of the gearbox has at least one circumferential groove and the profile of the retaining strips at least one circumferential collar complimentary thereto. For the construction of the retaining profile on the gearbox, which is generally constructed as a lathe tool part, it is consequently merely necessary to carry out a simple, cost-effective, e.g. cutting operation.

BRIEF DESCRIPTION OF THE DRAWINGS

The invention is described in greater detail hereinafter relative to a preferred embodiment and the attached drawings, wherein show.

DETAILED DESCRIPTION OF THE DRAWINGS

Figure 1:
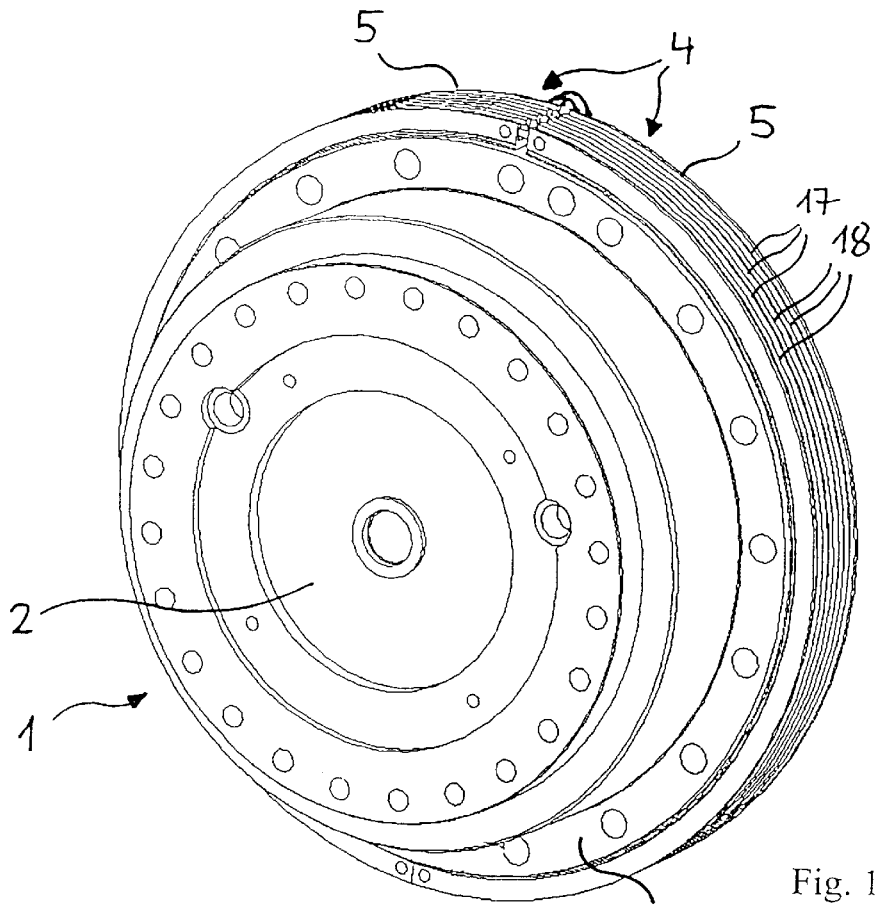
FIG. 1 A perspective view of a gear of a robot with retaining strips located on the gearbox circumference for fixing control cams.

FIG. 1 shows a gear of a robot axis of a not shown robot with a gear shaft 2 mounted in a gearbox 3. On the circumference of the gearbox 3 are located two arcuate retaining strips 4 for the fitting of not shown control cams for monitoring the swivel angle of the robot axis relative to a robot part connected in non-rotary manner to the gear shaft 2 and to which are fitted not shown switches operated by the control cams. In the embodiment shown the retaining strips 4 are constructed as grooved strips 5 with externally circumferentially directed webs 17 and grooves 18 for fixing the control cams. In the present case there are two grooved strips 5 completely embracing the gearbox 3 and which in each case extend round half the circumference of the gearbox 3.

Figure 2:
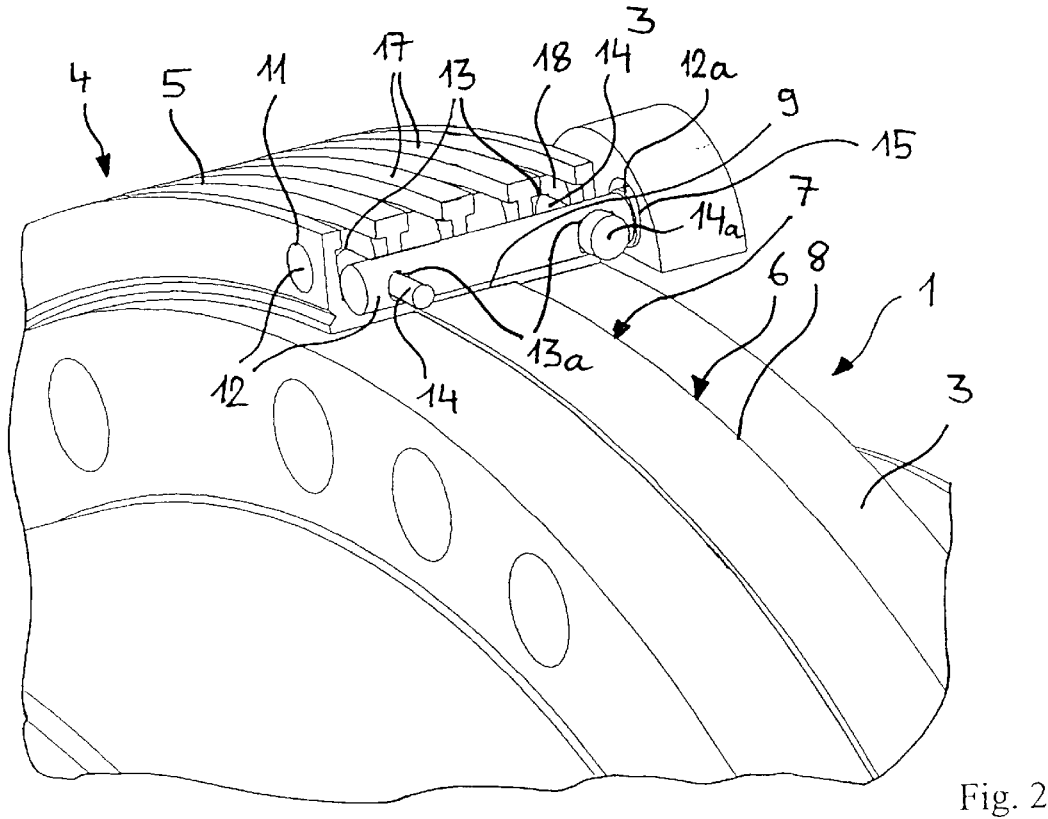
FIG. 2 A perspective detail view of the retaining strips placed on the gearbox according to FIG. 1.

As can be gathered from FIG. 2 the grooved strips 5 following bracing together are axially secured by a groove and tongue construction. For this purpose the outer circumference of the gearbox 3 has a retaining profile 6 and the inner circumference of the retaining strips 4 a profile 7 complimentary thereto for the positive bracing of the retaining strips 4 on the gearbox 3. Whereas the retaining profile 6 of the gearbox 3 has a substantially central circumferential collar 8, the profile 7 of the retaining strips 4 is constructed in the form of a circumferential groove 9 complimentary thereto, so that the retaining strips 4 are axially and positively fixed on mounting on the gearbox 3.

For the bracing of the retaining strips 4, the latter are provided in the vicinity of their ends with in each case one axially parallel hole 11, which receives a retaining pin 12. The retaining pins 12 are in each case radially traversed by two holes 13, 13a, which receive a locking screw 14. The locking screws 14 for bracing the retaining strips 4 in each case traverse the holes 13, 13a of the retaining pins 12 of two adjacent retaining strips 4 and at least the holes 13, 13a remote from a head 14a of the locking screws 14 are preferably constructed as tapped holes, in whose thread the locking screws 14 engage. By means of the locking screws 14 the circumferential bracing of the retaining strips 4 on the gearbox 3 can be adjusted.

In order to be able to fix the retaining strips 4 circumferentially to the gearbox 3, the retaining pins 12 in each case have a head 12a projecting out of the axial holes 11 positioned at the ends of the retaining strips 4 and which can be engaged in a recess 15 shaped on the robot part 3 to which is fixed the gearbox, e.g. the rocker arm. For fixing the control cams to the retaining strips 4 constructed as grooved strips 5, their webs 17 are given a substantially T-shaped profile, on which the not shown control cams are non-positively braced.

Figure 3:
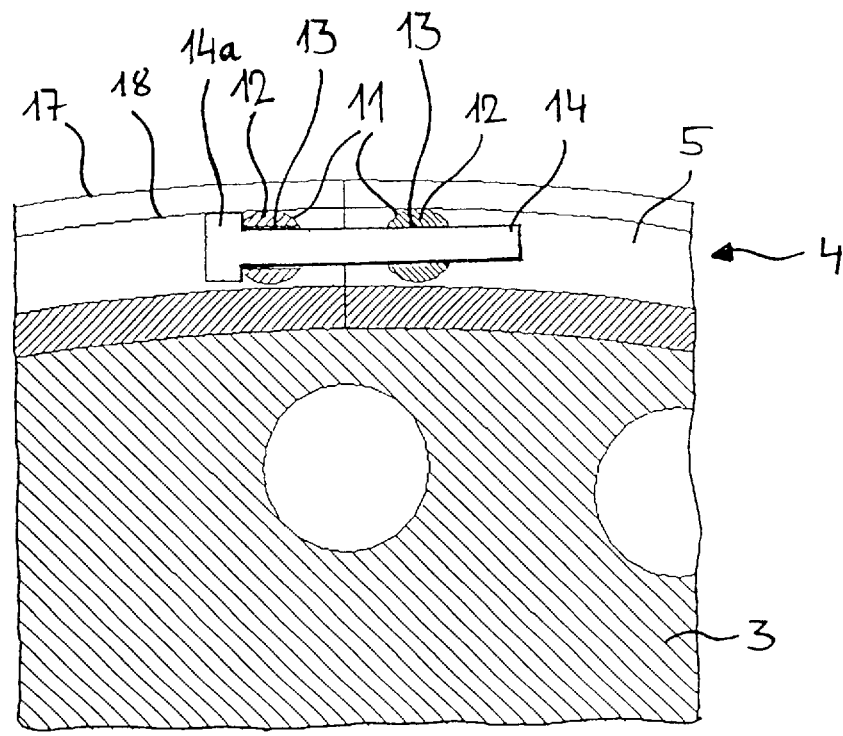
FIG. 3 A diagrammatic detail view of a cross-section through the gear according to FIG. 1.

FIG. 3 is a diagrammatic cross-section through the gearbox 3 according to FIG. 1 in the joining area of the two retaining strips 4. The retaining strips 4 are braced against one another by means of the locking screws 14, which radially traverse the retaining pins 14 located in the axial holes 11 at the ends of the retaining strips 4 and consequently brace the latter against one another.

Figure 4:
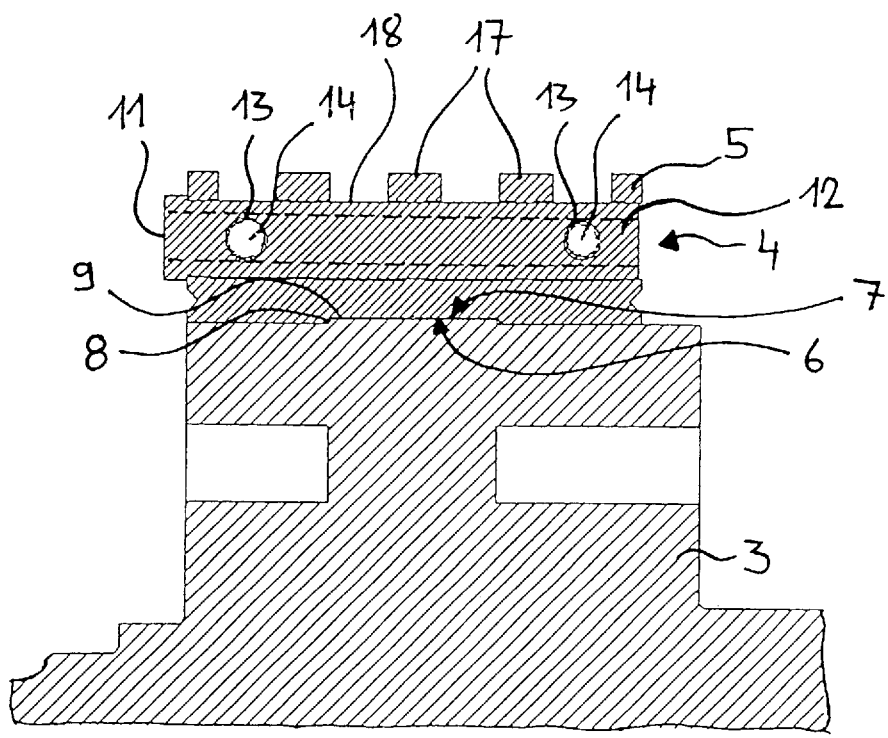
FIG. 4 A diagrammatic detail view of a longitudinal section through the gear according to FIG. 1.

The retaining profile 6 of the gearbox 3 constructed as a circumferential collar 8 and the complimentary profile 7 of the retaining strips 4 constructed as a circumferential groove 9 are shown again in FIG. 4 in the form of a longitudinal section.

LIST OF REFERENCE NUMERALS

| 1 | Gear |
| 2 | Gear shaft |
| 3 | Gearbox |
| 4 | Retaining strip |
| 5 | Grooved strips |
| 6 | Retaining profile |
| 7 | Profile |
| 8 | Circumferential collar |

-continued

LIST OF REFERENCE NUMERALS

| 9 | Circumferential groove |
| 11 | Axial hole |
| 12 | Retaining pin |
| 12a | Retaining pin head |
| 13, 13a | Hole |
| 14 | Locking screw |
| 14a | Locking screw head |
| 15 | Recess |
| 16 | Web |
| 17 | Groove |

What is claimed is:

1. Multiaxis robot with at least one gear associated with a robot axis and having a gearbox with positionable retaining strips for fixing control cams for monitoring the swivel angle of the robot axis, said retaining strips being constructed in substantially arcuate manner with an inner circumference roughly corresponding to the outer circumference of the gearbox, and said retaining strips being frontally braceable against one another for fixing on the gearbox, wherein in the vicinity of their ends, the retaining strips have in each case an axial hole receiving a retaining pin, each retaining pin being radially traversed by at least one hole serving to receive a locking screw traversing the holes of the retaining pins of two adjacent retaining strips for bracing the retaining strips on the gearbox.

2. Multiaxis robot with at least one gear associated with a robot axis and having a gearbox with positionable retaining strips for fixing control cams for monitoring the swivel angle of the robot axis, said retaining strips being constructed in substantially arcuate manner with an inner circumference roughly corresponding to the outer circumference of the gearbox, and said retaining strips being frontally braceable against one another for fixing on the gearbox, wherein the inner circumference of the retaining strips has a profile complimentary to the retaining profile located on the outer circumference of the gearbox for the positive bracing of the retaining strips on the gearbox.

3. Robot according to claim 1, wherein the retaining pins are in each case traversed by two holes.

4. Robot according to claim 1, wherein at least one of the holes, traversed by the locking screw, of the retaining pins of two adjacent retaining strips is a tapped hole.

5. Robot according to claim 1, wherein the retaining strips can be radially fixed to the gearbox by means of the retaining pins projecting at least at one side out of the axial holes of the retaining strips.

6. Robot according to claim 1, wherein the retaining strips are constructed as grooved strips with externally circumferentially directed webs and grooves for fixing the control cams.

7. Robot according to claim 6, wherein the webs of the grooves strips have a substantially T-shaped profile.

8. Robot according to claim 1, wherein there are two retaining strips substantially completely embracing the gearbox.

9. Robot according to claim 2, wherein the retaining profile of the gearbox has at least one circumferential collar and the profile of the retaining strips at least one circumferential groove complimentary thereto.

10. Robot according to claim 2, wherein the retaining profile of the gearbox has at least one circumferential groove and the profile of the retaining strips at least one circumferential collar complimentary thereto.

* * * * *